March 3, 1964

W. MÖLLER 3,123,785

ANGULAR POSITION TRANSDUCER

Filed Sept. 21, 1959

*INVENTOR.*
WALDEMAR MÖLLER
BY

March 3, 1964  W. MÖLLER  3,123,785
ANGULAR POSITION TRANSDUCER
Filed Sept. 21, 1959  2 Sheets-Sheet 2

INVENTOR.
WALDEMAR MÖLLER
BY

United States Patent Office 3,123,785
Patented Mar. 3, 1964

3,123,785
ANGULAR POSITION TRANSDUCER
Waldemar Möller, Überlingen (Bodensee), Germany, assignor to Bodenseewerk Perkin-Elmer u. Co. G.m.b.H., Überlingen (Bodensee), Germany
Filed Sept. 21, 1959, Ser. No. 841,327
Claims priority, application Germany Sept. 24, 1958
5 Claims. (Cl. 336—135)

This invention is concerned with an electric tap which is particularly intended for remote position indicating or for measuring and control purposes.

As is well known, an electric tap is often used for such purposes to obtain an electric signal proportional to the rotary movement about an axis of sensitivity. The rotation, in most cases, is limited to a relatively small angle. If resistance taps are used, a discontinuous and irregular curve of the measured value is obtained even if fine-wire potentiometers are employed. Since, however, such measured values must often be subjected to electric calculating operations, to determine integrals or time differentials for instance, undesirable interference effects result with potentiometer taps. On the other hand, inductive taps of various designs are well known in the art. In these, alternating currents in accordance with the rotating movement to be measured are induced in an induction coil or in a pair of induction coils of an induction system which is excited by means of an alternating current. With such inductive taps, it is possible to express the direction of the rotary movement by the phase position of the induced alternating voltage. Continuously variable measured values are obtained with such inductive taps. However, if high demands with regard to accuracy are made, considerable difficulties arise with the conventional inductive taps due to mechanical causes. It has been found that the curves of measured values with right-hand and left-hand deviations in most cases fail to coincide with sufficient accuracy. The reason for this phenomenon is to be found in the fact that small mechanical and hardly avoidable eccentricity errors are introduced by those parts of the inductive tap which can be rotated with respect to each other.

The invention has for its object the provision of an electric tap that gives continuously variable measured values which satisfy even the highest demands made with respect to accuracy.

According to the invention this object is accomplished by arranging several induction systems provided with excitation windings and induction coils in the form of a circle concentric with the axis of sensitivity. The excitation windings and induction coils of these systems are connected with each other in circular symmetrical arrangement, in order to effect a balancing of eccentricity errors. With such a design, the measured value is obtained from several induction systems the errors of which balance each other as a consequence of the circular symmetrical arrangement. Also, considerable advantages from the standpoint of manufacturing are offered by a tap of such type. Actually, it is possible to design the tap so that the induction systems form a common magnet ring and a common armature ring that is subdivided into segments and rotatable about the sensitivity axis. A structural arrangement of the tap system is thereby obtained which is similar to that of an electric motor and which may be readily manufactured by the application of methods commonly employed in small motor construction.

The apparatus of this invention will be apparent from the following description together with the figures of the attached drawings wherein.

Figure 1:
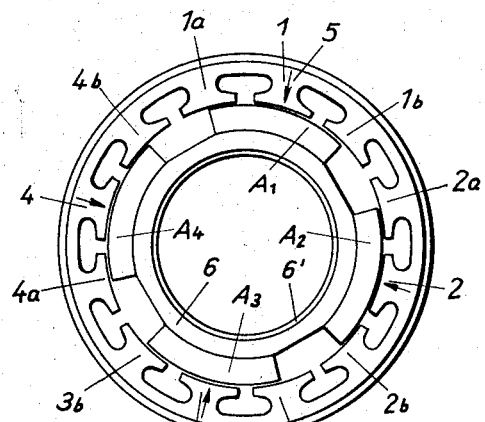
FIG. 1 is a front view of an apparatus embodying the invention.
Figure 2:
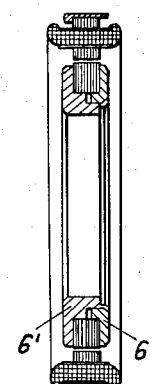
FIG. 2 is a cross-sectional elevation of the device of FIG. 1.

With the tap system shown diagrammatically in FIGS. 1 and 2, each induction system has a central pole 1 through 4 carrying an excitation winding and two lateral poles (1a through 4a and 1b through 4b) each carrying an induction coil. The central and lateral poles form a common lamellar magnetic ring 5. A two-part rotatable armature ring 6, 6' is arranged inside the magnetic ring 5. Four lamellar armatures $A_1$ through $A_4$ having the shape of circular segments are embedded in said two-part armature ring 6, 6'. The armatures $A_1 \ldots A_4$ are arranged symmetrically in front of each of the main poles 1 ... 4 leaving a small air gap between them and said poles. Each armature reaches from the center of one of the lateral poles 1a ... 4a to the center of one of the other lateral poles 1b ... 4b. The armature ring 6, 6' can be rotated in either direction by approximately half a pole pitch. If the armature ring 6, 6' is in its central position, the magnetic flux through each of armatures $A_1 \ldots A_4$ is uniformly distributed to the two lateral poles 1a ... 4a and 1b ... 4b, so that in each case equal voltages are induced in the windings of the lateral poles. It is possible by rotating the armature ring 6, 6' to shift the magnetic flux towards one lateral pole so that unequal induction voltages are generated in the windings of the lateral poles. The difference of the unequal induction voltages is a measure of the rotation of armature ring 6, 6'.

Figure 7:
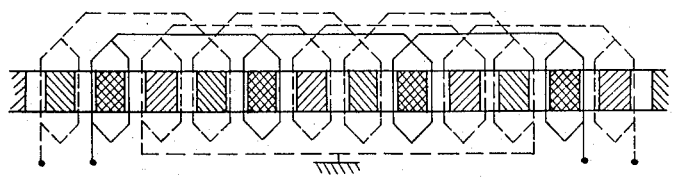
FIG. 7 is a schematic winding development of the stator of the device of FIG. 1.

The manner in which the stator of this device is wound will be apparent from FIG. 7. In this figure, the primary winding is shown as a solid line and the secondary as a broken line. As will be seen, poles 1, 2, 3, 4 are wound in the same direction and are connected in series. Each of the "a" and "b" pole groups are similarly wound but the groups are in "bucking" relationship.

Figure 3:
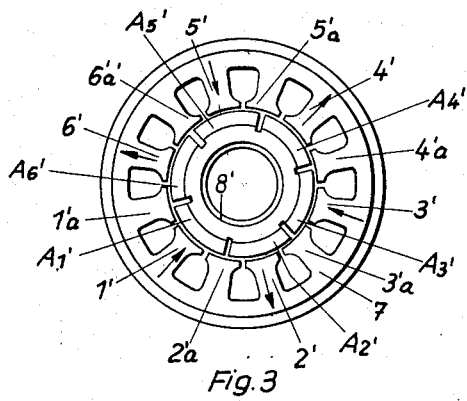
FIG. 3 is a front view of a variation of the apparatus of the invention.
Figure 4:
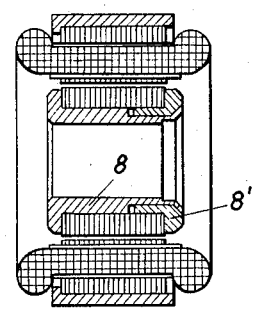
FIG. 4 is a cross-sectional elevation of the device of FIG. 3.

With the embodiment shown in FIGS. 3 and 4, a magnetic ring 7 is provided which comprises main poles 1' ... 6' alternately excited with different polarity and which has secondary poles 1'a ... 6'a with induction windings between these main poles. An armature ring 8, 8' carries armatures $A1' \ldots A6'$ corresponding in number to the main poles. The armatures have the form of circular segments and are arranged in front of the main poles 1' ... 6' with a narrow air gap between these armatures and the main poles. In the central position, each of these armatures $A1' \ldots A6'$ overlaps approximately half of a secondary pole lying at either side of a main pole. Since two neighbouring main poles (say 1' and 2') are excited with opposite polarity, the oppositely directed partial flows balance each other in the secondary pole (2'a) lying between them. Thus, no voltage is induced in the induction coils when the armature ring 8, 8' is in its central position. Upon rotating the armature ring 8, 8', the equilibrium of flow is disturbed in the secondary poles 1'a ... 6'a, so that a voltage is induced in each induction winding. The phase of the voltage is a function of the direction of rotation of the armature ring 8, 8'.

Figure 8:
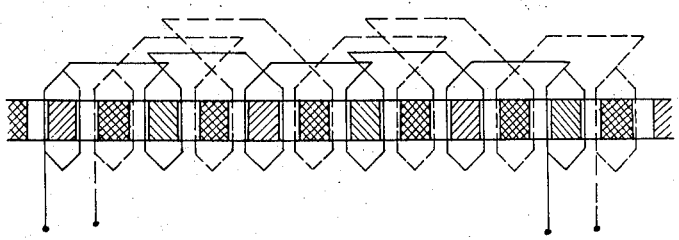
FIG. 8 is a schematic winding development of the stator of the device of FIG. 3.

The winding of the device of FIGS. 3 and 4 is developed in FIG. 8. The primary winding (solid line) is shown as wound on poles 1', 2', 3', 4', 5', and 6' to provide alternately reversed magnetic polarity. The secondary winding (broken line) is wound in a similar fashion on alternate poles 1'a, 2'a, 3'a, 4'a, 5'a, and 6'a.

Figure 5A:
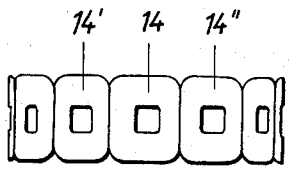
FIG. 5a is a plan view of the rotor winding of the device of FIG. 5 shown removed from the apparatus.
Figure 5:
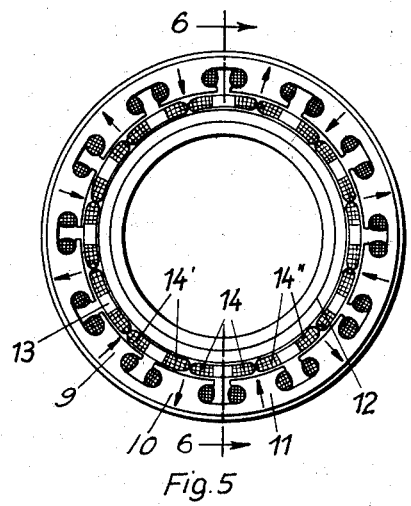
FIG. 5 is a front view of still another variation of the apparatus of the invention.
Figure 6:
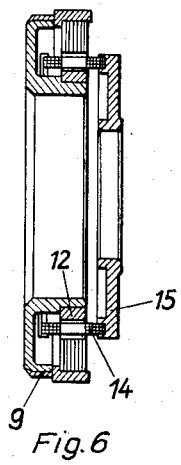
FIG. 6 is a cross-sectional elevation of the device of FIG. 5.

A dynamic inductive tap is shown as another modified embodiment of the invention in FIGS. 5, 5a and 6. This tap has a magnetic ring 9 by means of which neighbouring poles (10, 11) are excited oppositely in phase by an alternating current of high frequency. A stationary iron ring 12 is arranged inside the magnetic ring 9. A cylindrical coil body 14 projects into the air gap 13 formed between the magnetic ring 9 and the magnetic shunt ring 12. The coil body 14 is supported by a carrier 15 which is rotatable the axis of sensitivity. The generated surface of the coil body 14 is composed of single coils 14', 14", each of which lies within the reach of two neighbouring poles 10, 11 of the magnetic ring 9, when the coil body 14 is in its central position. In case of a rotational displacement of coil body 14, an alternating voltage is induced in the individual coils 14', 14" which is modulated in proportion to the velocity of rotational displacement of the coil body.

Figure 9:
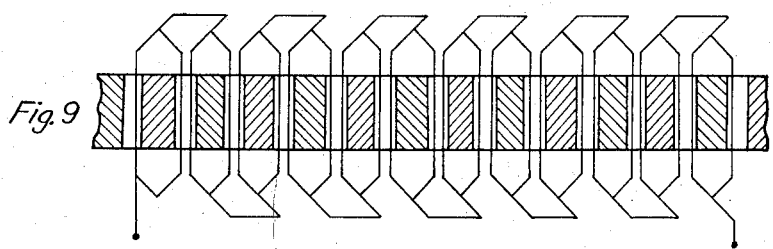
FIG. 9 is a schematic winding development of the stator of the device of FIG. 5.
Figure 10:
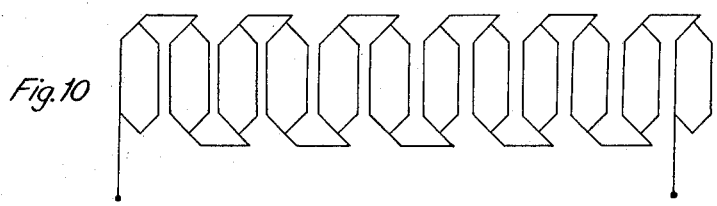
FIG. 10 is a schematic winding development of the rotor of the device of FIG. 5.

The winding development for the apparatus of FIG. 5 is shown in FIGS. 9 and 10. The primary stator winding is shown in FIG. 9 and will be seen to comprise a plurality of alternately oppositely wound coils on the stator poles. In this way, opposite fluxes are induced in adjoining poles as indicated in FIG. 5.

The development of FIG. 10 illustrates the manner in which the rotor, or "secondary" 14, is wound.

I claim:

1. Apparatus for producing a signal in accordance with rotational displacement, comprising in combination:
   a stator having a multiplicity of inwardly projecting salient poles symmetrically arranged about an axis of rotation;
   a plurality of windings, each winding surrounding a pole of said stator, said windings being energized by alternating current and being alternately oppositely wound to magnetize adjacent stator poles oppositely;
   a rotor mounted for partial rotation within said stator, and being formed to provide an air gap between said rotor and stator; and
   a rotor winding formed from a multiplicity of coils carried by said rotor and lying within the air gap between said rotor and stator.

2. The combination claimed in claim 1 in which said rotor winding is in the form of a cylinder made up of individual coils circumferentially adjacent.

3. The combination claimed in claim 1 in which said rotor winding is in the form of a cylinder made up of individual coils circumferentially adjacent, and equal to the number of poles on said stator.

4. The combination claimed in claim 1 in which said rotor winding is in the form of a cylinder made up of individual coils circumferentially adjacent, and in undisplaced position of said rotor, each coil having an equal portion traversed by the flux from adjacent stator poles.

5. The combination claimed in claim 1 in which said rotor winding is in the form of a cylinder made up of individual coils circumferentially adjacent, and in central position of said rotor, each coil lying under two adjacent stator poles.

References Cited in the file of this patent

UNITED STATES PATENTS

| | | |
|---|---|---|
| 1,736,551 | Schou | Nov. 19, 1929 |
| 2,442,751 | Abbott | June 8, 1948 |
| 2,564,484 | Kuehni | Aug. 14, 1951 |
| 2,909,739 | Cherniak | Oct. 20, 1959 |
| 2,941,140 | Rudolf et al. | June 14, 1960 |